United States Patent [19]

Bredesen et al.

[11] 3,839,708

[45] Oct. 1, 1974

[54] INPUT-OUTPUT TERMINAL FOR HOSPITAL INFORMATION SYSTEM

[75] Inventors: Philip N. Bredesen, Lexington; Wendell V. Knowles, Chelmsford; Francis T. Lyons, Sudbury; Edward B. Rawson, Lincoln; Daniel B. Schwarzkopf, Stow, all of Mass.

[73] Assignee: Searle Medidata Inc., Lexington, Mass.

[22] Filed: June 28, 1972

[21] Appl. No.: 267,082

[52] U.S. Cl. .............................................. 340/172.5
[51] Int. Cl. ......... G06f 3/04, G06f 3/12, G06f 3/14
[58] Field of Search .................................. 340/172.5

[56] References Cited

UNITED STATES PATENTS

| | | | |
|---|---|---|---|
| 3,187,321 | 6/1965 | Kameny | 340/172.5 |
| 3,302,189 | 1/1967 | Korkowski et al. | 340/172.5 |
| 3,335,407 | 8/1967 | Lange et al. | 340/172.5 |
| 3,380,031 | 4/1968 | Clayton et al. | 340/172.5 |
| 3,524,970 | 8/1970 | Wang | 340/172.5 |
| 3,571,802 | 3/1971 | Serra | 340/172.5 |
| 3,588,838 | 6/1971 | Felcheck | 340/172.5 |
| 3,596,256 | 7/1971 | Alpert | 340/172.5 |
| 3,631,403 | 12/1971 | Asbo et al. | 340/172.5 |
| 3,648,252 | 3/1972 | Thron et al. | 340/172.5 |
| 3,702,462 | 11/1972 | England | 340/172.5 |
| 3,737,863 | 6/1973 | Rowland et al. | 340/172.5 |

*Primary Examiner*—Gareth D. Shaw
*Attorney, Agent, or Firm*—Weingarten, Maxham & Schurgin

[57] ABSTRACT

A data input-output terminal for use with a hospital information system and having input and output capabilities that permit rapid and accurate medical data exchange through a centralized hospital data facility. The terminal provides a readily useable system for the input and output of large volumes of complex and changeable medical information and patient instructions at low cost so that many terminals may be distributed throughout a hospital and at independent doctors offices. The terminal is adaptable in its configuration and output format in order to operate in diverse environments including nursing stations, laboratory or pharmacy departments, and administrative offices and provides input and output formats suitable for each area of use. Multiple input and output capabilities of each terminal provide the terminal operator with a system which is more convenient to use and which provides greater reliability and accuracy in the use of the terminal.

20 Claims, 9 Drawing Figures

INPUT-OUTPUT TERMINAL FOR HOSPITAL INFORMATION SYSTEM

FIELD OF THE INVENTION

This invention relates to data input-output terminals and in particular to a terminal providing multiple format input and output of medical information.

BACKGROUND OF THE INVENTION

Hospital information systems are known for the storage, processing and ready access of data respecting the various requirements of a hospital such as administrative, medical, surgical and maintenance departments. The system is computer based and the interface with the system is provided by a plurality of data input-output terminals by which personnel can gain access to the system for entering and receiving requisite data.

The requirements for such a data input-output terminal in a hospital environment are complex and variable for a variety of reasons. Since a substantial portion of data applied to the information system will concern a patient such as for dietary or pharmacy oders and surgical or laboratory appointments, a convenient means is required to accurately enter the identity of a patient for whom data is relevant, and for confirming to the terminal operator proper receipt of the identification by the information system.

The broad range of personnel and department responsibilities of a hospital requires that a data terminal be equipped to detect the identity of the operator to insure proper authorization for data entered and received.

Although particular data requirements may vary from department to department in a hospital, all input-output terminals should be of the same basic design and operation for economy of production and simplification of operator training.

To permit full use of the capabilities of computer control by the operator over entered data further provision is required to enable voiding or monitoring of data as desired and for indicating the priority of messages such as those requiring immediate attention.

In addition to the previously mentioned patient identification display, an output capability is required for displaying for information and record purposes all data of a transaction which is pertinent to a given terminal.

Further terminal output capability is required to bring attention to immediate action requests as well as to identify control data. Other features not under direct operator control are desireable to provide acknowledgement of proper data reception, to communicate to the information system changes in terminal status and to provide test and diagnostic functions.

BRIEF SUMMARY OF THE INVENTION

To fulfill the requirements of multiple data input and output, the terminal of the present invention is provided with input data sources for patient identification, operator identification, control data, basic message data as well as automatically operative sources for terminal status, acknowledgement and diagnostic data. Output data displays are provided at the terminal for presenting a patient name for confirmation, for printing received messages in diverse formats, and for control indications. A data transmission system is operative to accept data from the several sources according to a predetermined priority scheme and to transmit the data to the hospital information system. Data received from the information system is routed according to information content to the appropriate display.

To provide for identification of the terminal operator to the hospital information system, a card reader is supplied, in the typical implementation, at the terminal. Hospital personnel having identification cards activate the terminal by insertion of a card into the reader where coded holes are read to provide a corresponding signal for application to the data transmission system.

The generation of basic message data covering a variety of different and changeable hospital department information requirements is typically provided by data selections from a repertory stored on a number of overlays. A touch activated switch array is provided to receive a desired overlay and to detect coding in the overlay representing the particular overlay in place and to detect activation of one switch in the array corresponding to the selected data. Two signals are generated representing overlay coding and activated switch location to identify the input data selected from the repertory.

A patient identification keyboard is part of the switch array in the present implementation, but separately located and not operative with the overlay system, and is employed for identifying to the information system a particular patient. Each switch may have an alphanumeric designation or correspond to one patient in a replaceable patient name roster. The patient identification is coded in a signal corresponding to the activated switch and the coded signal is applied to the data transmission system.

Also, part of the switch array are several control switches which generate void, send or monitor orders or requests for immediate attention to selected data. These signals are similarly applied to the data transmission system.

The patient name identified to the hospital information system is returned and directed to a patient name display at the terminal. The patient name display comprises a plurality of alphanumeric character displays which are selectively energized in response to received data to mark the patient name.

Basic message data received at the terminal is routed to a printer designed to accept different paper formats. Depending upon terminal location, the printer paper format can be varied to provide multiple copy tear sheets, direct-apply drug labels, or other desired record or working copies.

Several indicators on alarms are provided for activation by control data received from the hospital information system including an indicator-responder for displaying requests for immediate attention and generating for transmission a signal indicating operator attention thereto. A received data format detector is provided in the terminal to sense proper data format and generate an acknowledging signal for application to the data transmission. The status of several terminal conditions such as print paper supply is monitored and any status change results in the generation of corresponding data for transmission. Additionally, a test system is built into the terminal to permit repair personnel to evaluate terminal operation and a transponder system is provided to respond to predetermined received data to cause transmission of data from an identified input source.

BRIEF DESCRIPTION OF THE DRAWINGS

These and other features of the present invention will be more fully understood by reference below to the detailed description of a preferred embodiment presented for purposes of illustration, and not by way of limitation and to the accompanying drawings of which.

DETAILED DESCRIPTION OF THE PREFERRED EMBODIMENT

Figure 1:
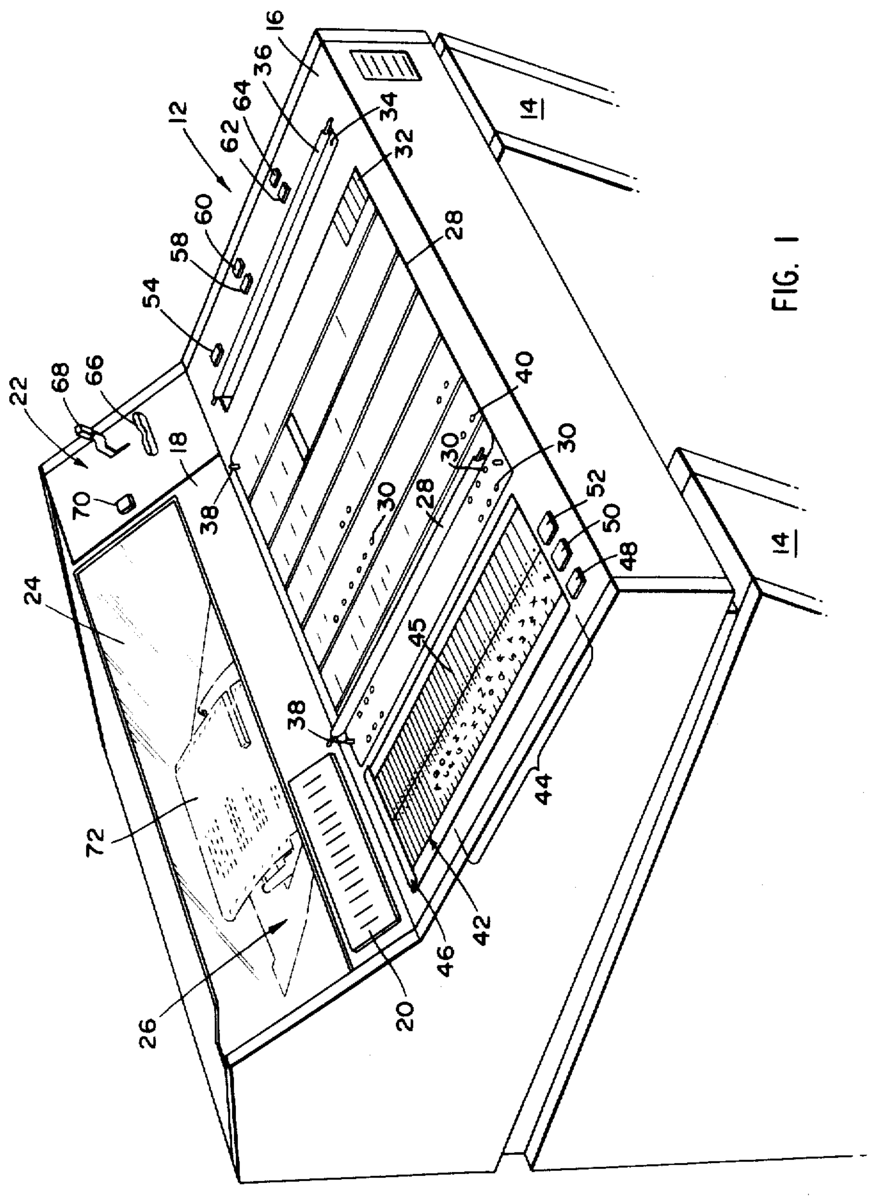
FIG. 1 is a pictorial representation of physical construction of an input-output terminal according to the invention.

The physical features of a preferred input-output terminal are presented in the pictorial view in FIG. 1. The terminal has an upper desk portion 12 supported on legs 14. On the desk portion 12 an input and control panel 16 extends over the front portion of the desk 12 and has behind it a slanted panel 18 containing a patient name display 20 and an operator card reader 22. A transparent dust cover 24 houses a printer mechanism 26.

Returning to the control panel 16 an overlay 29 is indicated in place over a matrix of touch activated switches 30. The overlay 28 has an overlay identification section 32 which cooperates with a detection system in the desk portion 12 to identify the particular overlay in place as will be indicated below. A bin 34 contains a plurality of additional overlays 36 which may be selected and applied over the touch point switches 30 in alignment as provided by locating pins 38.

The overlay 28 has a plurality of holes 40 which become superimposed above the touch point switches 30 when the overlay is positioned by the locating pins 38. Adjacent each hole 40 in overlay 28 is a written instruction or order such as a request for a pharmacy, dietary, or laboratory item which the operator may select for entry as will be explained below.

Each switch 30 in the matrix of touch activated switches is provided by the intersection of a strip conductor and a conducting rubber ribbon. A plurality of strips and ribbons are provided so that one intersection occurs beneath each switch 30. The ribbons and strips are spaced by a thin sheet of insulating plastic having holes therethrough in alignment with the touch switches 30 such that pressure applied by a blunt stylus at each switch 30 causes the conducting rubber and metal to touch and provide a closed electrical circuit therebetween. Such a system of conducting strips and ribbons is commercially available today and may be cut to specific dimensions desired for use with the terminal disclosed. A scanning system to be described operates to sample each intersection corresponding to each touch activated switch 30 to determine its activation state.

Additional touch activated switches are arranged in two columns in a portion 42. An overlay 46 which may be temporary or permanent determines the message associated with each switch. A first group 44 in the portion 42 is provided as an alpha keyboard having each character in the alphabet associated with one of the touch activated switches. Where the terminal is employed at a nursing station, the overlay may contain in a second group 45 the name of each patient at the nursing station with the overlay updated on a daily basis.

An immediate action request phrase may be provided in association with one switch in the overlay 28 or 46 to generate a STAT message indicating that the originating terminal requests immediate attention to the preceeding message.

A series of three buttons 48, 50 and 52 are provided below the portion 42 of touch activated switches and are employed as control buttons respectively to send, audit, or void the information entered by the operator through the other entry buttons.

To the right on the input and control panel 16 are a series of indicator buttons comprising a repeat indicator light 54, a local print form feed button 58 to index the printer to the top of the next page, a line feed button 60 to index the print form one line, a paper-out indicator 62 to represent a printer paper-out condition and a STAT indicator button 64 which operates with an alarm buzzer 65 to indicate when a terminal needs immediate attention. The paper-out button 62 is resetable by activation thereof.

The card reader portion 22 comprises a card insert slot 66 and a card eject lever 68. An operator accepted light 70 indicates that the computer based hospital information system has received the indicia sensed on the inserted card and that the terminal is enabled for further data exchange as will be explained below.

The display 20 comprises a plurality of individual character displays which are illuminated in response to received data to continuously present a patient name in response to extraction of that name from the appropriate address called by operator activation of one of the touch activated switches in the portion 42.

The printer mechanism 26 which is protected beneath the dust shield 24 provides a running printout of information on a paper sheet 72 which can be of several constructions including separable sections with adhesive for attaching to pharmacy orders, or larger pages made up in duplicate for record keeping or other purposes. For other applications the printer 26 can be caused to print information in one continuous column to provide a running copy of a day's transactions at that station.

Figure 2:
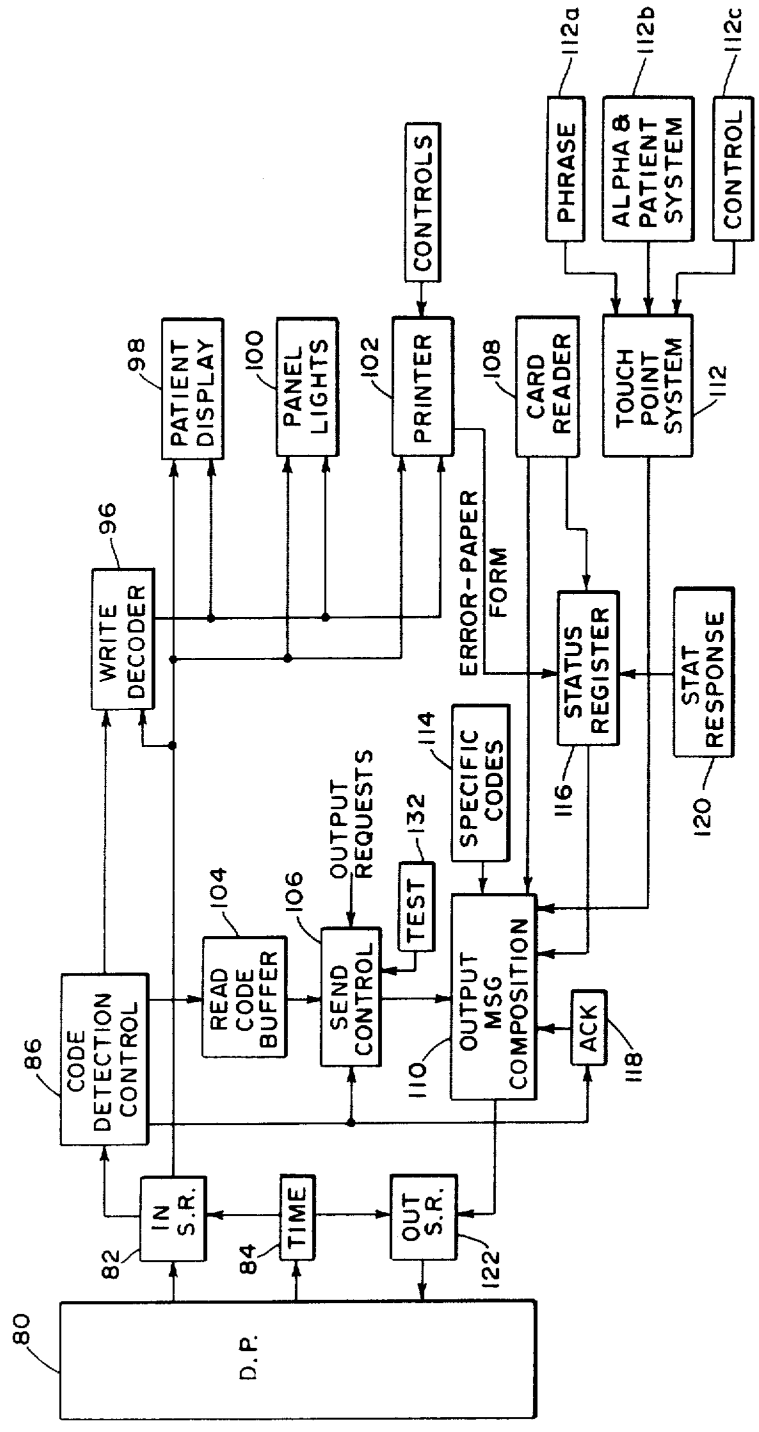
FIG. 2 is a general block diagram of the functioning of the components of the terminal of FIG. 1.
Figure 2A:
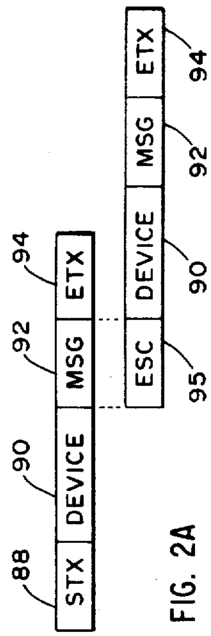
FIGS. 2A and 2B are data format diagrams useful in understanding the invention.
Figure 2B:
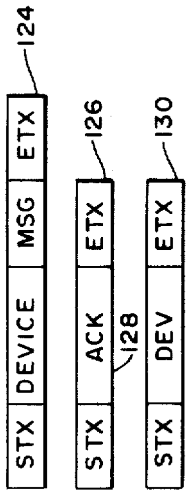
Figure 3A:
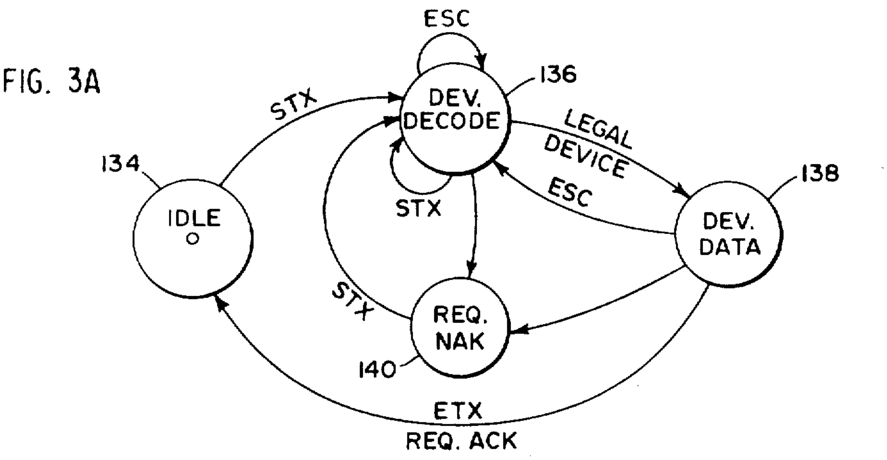
FIGS. 3A–3C are state diagrams representing the functioning of the system generally indicated in FIG. 2.
Figure 3B:
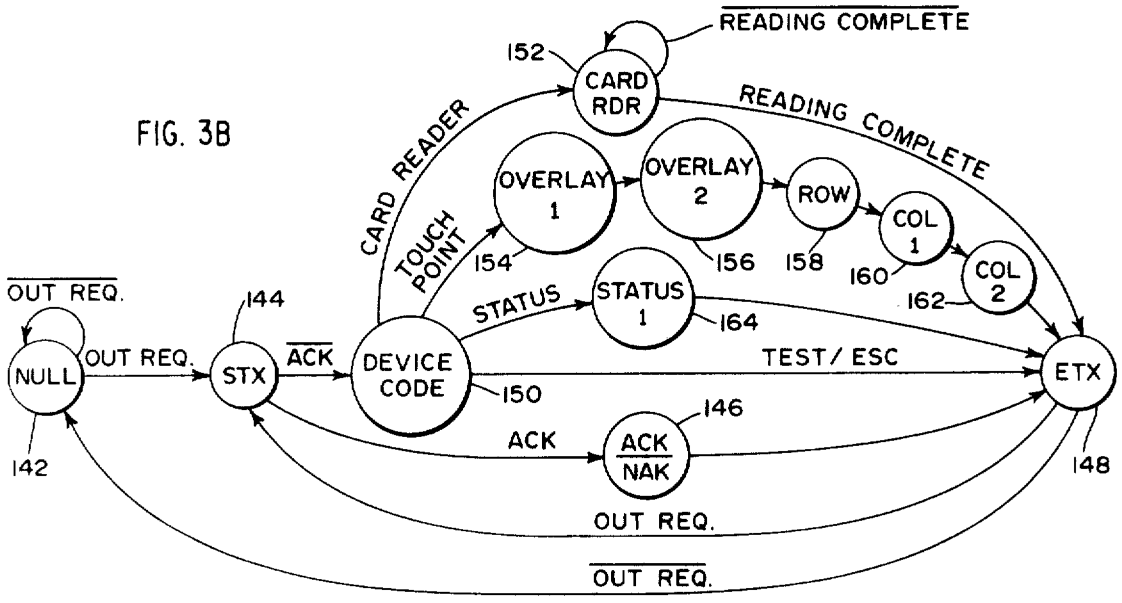
Figure 3C:
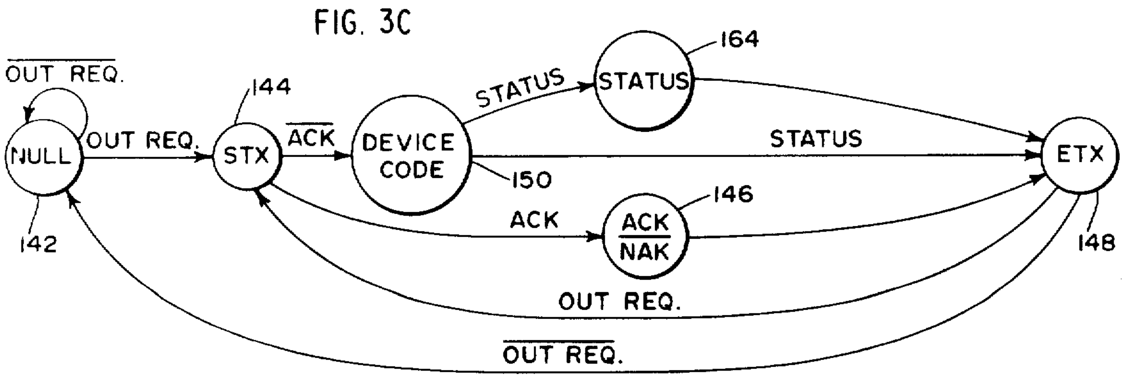

Referring now to FIG. 2, a general system block diagram is presented which, in conjunction with the data format diagrams of FIG. 2A and 2B and the operational state diagrams of FIGS. 3A–3C will indicate the overall system structure and functioning. Data is applied to the terminal from a hospital information data processing system 80 and is received in an input shift register 82 which is strobed by a system time clock 84 providing appropriate timing throughout the terminal electronics. The contents in the input shift register 82 is sensed by a code detection system 86 which operates to detect the various components of incoming data. In particular, in FIG. 2A is indicated the general data format for incoming information and comprises a start-text word (STX) 88, a device code word (DEVICE) 90 which specifies the particular unit for which the input data is addressed, a message portion (MSG) 92 composed of the data words that specify the information being communicated to the terminal, and an end-text word (ETX) 94 having a unique code word to identify the termination of a communication for that station terminal. In place of ETX portion 94 an ESC (GS in ASCII) escape code 95 may be received to indicate a new device code 90 and message 92 is to follow. While the system 80 is disclosed fully in an accompanying case, its operation is not essential to an understanding of the present terminal. For the purpose of providing data input in the form of FIG. 2A any data input source may be assumed, for example a Teletypewriter, or the data may be provided directly from a further terminal. The code detection system 86 responds to the uniquely recognizable start-text code (STX) 88 to begin system receive operation and to control the decoding and routing for subsequently received words according to the format of FIG. 2A. The bits of the device code (DEVICE) 90 address one of the input-output systems and indicate either a write or read command. In typical ASCII codes, sufficient binary combinations are present to include additional addressable output units at the terminal. In the case of a write command, a write decoder 96 is activated which determines the particular output device for which information is addressed. Accordingly the write decoder 96 is connected to activate a patient display system 98, a panel light system 100 or a printer system 102, these corresponding respectively to the display 20, lights 54 and 64, and printer mechanism 26 of FIG. 1. Data output of the shift register 82 is also applied to the display 98, panel light system 100 and printer system 102 so that when the appropriate output device is activated, subsequent information in the shift register 82 comprising the message portion 92 is applied directly to the output device for utilization thereby.

If the device code in the portion 90 indicates that the incoming information is a read message as distinct from a write message a read code buffer 104 is activated and receives the device code for application to a send control system 106 to cause transmission of data from the indicated device.

In the transmitter portion of the terminal of FIG. 2 a card reader 108 applies data to an output message composition system 110. This data represents identification indicia read from a card inserted through the slot 66 of FIG. 1. A touch point system 112 operates in response to three sets of input switches respectively, an instruction phrase code in section 112a generated by the touch point switches 30, for basic message content, patient identification and alpha data in section 112b from the switches in the portion 42 to identify the patient or subject the data relates to, and control information in section 112*c* from the control switches 48, 50 and 52. A digital representation of the particular switch in the matrix activated is applied to the output message composition circuit 110. The output message composition system 110 also receives specific hard wired data codes from a specific code system 114, status messages from a status register 116 and acknowledged (ACK) or not-acknowledged (NAK) codes from an acknowledgment system 118. The status register 116 receives status information from the printer 102, card reader 108 and a STAT condition response switch 120.

The output message composition system 110 receives control data from the send control system 106 which in turn receives indications of data being generated by the various elements capable of originating information within the terminal such as the status register 116, acknowledgment system 118, card reader 108, printer 102, and touch point system 112. The send controller 106 sets the output message composition 110 to select the data from the particular unit detected. In the case where more than one unit generates data simultaneously, a priority sequence within the send control system 106 selects the data source according to that priority and thus causes the output message composition system to respond to information generated by the source having the highest priority. That data is then applied to an output shift register 122 which in turn is clocked out to the data processing system 80 in accordance with the time base generated by the time system 84.

The output message format is indicated in FIG. 2B as comprising three different types depending upon the nature of the message being sent. A format 124 substantially the same as that indicated in FIG. 2A is used for most message types. Format 126 is used for acknowledgment or non-acknowledgment messages and is abbreviated to contain only an acknowledgment section 128 between start- and stop-text portions (STX and ETX). A format 130 is a test format and comprises only the start- and stop-text portions (STX and ETX) and a device code (DEVICE) therebetween. The format 130 is used when a test circuit 132 is activated by maintenance personnel to request a test message from send control system 106.

The output message composition system 110 follows the appropriate format according to the signals from the send control system 106 to generate a start-text code from the specific code circuit 114 followed by an appropriate device code according to the highest priority device with a data output request applied to the send control system 106. The data from that source with the highest priority is applied through the message composition system 110 to the output shift register 122. An end-text signal is finally generated from the specific code system 114. The acknowledge message of format 126 is generated each time an end-text is detected in received signals by the code detection circuit 86. An acknowledge request is applied by this circuit 86 to the send control system 106 to activate the acknowledgment code generator 118 so that, according to the priority system, the output message composition system 110 will generate the acknowledgment message in response to each properly received endtext signal and thus advise the hospital information system 80 of proper reception of data.

Whenever the received information indicates a read device code rather than a write device code the read code buffer 104 is activated and the send control system 106 is in turn activated to cause the output message composition system 110 to generate a message for transmission as though the device in the buffer 104 had been activated at the terminal by the operator for generating data. The use of this output technique provides a diagnostic check whereby the data processing system 80 can cause the terminal to transmit a message according to the appropriate format for the device in the read code. Transmitter and receiver operation can be checked in this way.

Status messages contained in the register 116 follow format 124 wherein the message portion is indicative of the condition of a plurality of status inputs to the register 116. In particular, the status message can indicate any of three conditions detected in the printer 104 including an error, paper out or positioning of the printer to begin printing at the top of a new sheet. The STAT condition response switch 120 also provides an indication to the register 116 which causes an output message indicating that the operator has responded to a STAT condition as explained below. The status register 116 also receives an indication from the card reader 104 showing if the operator card is in the reader 108.

Figure 4:
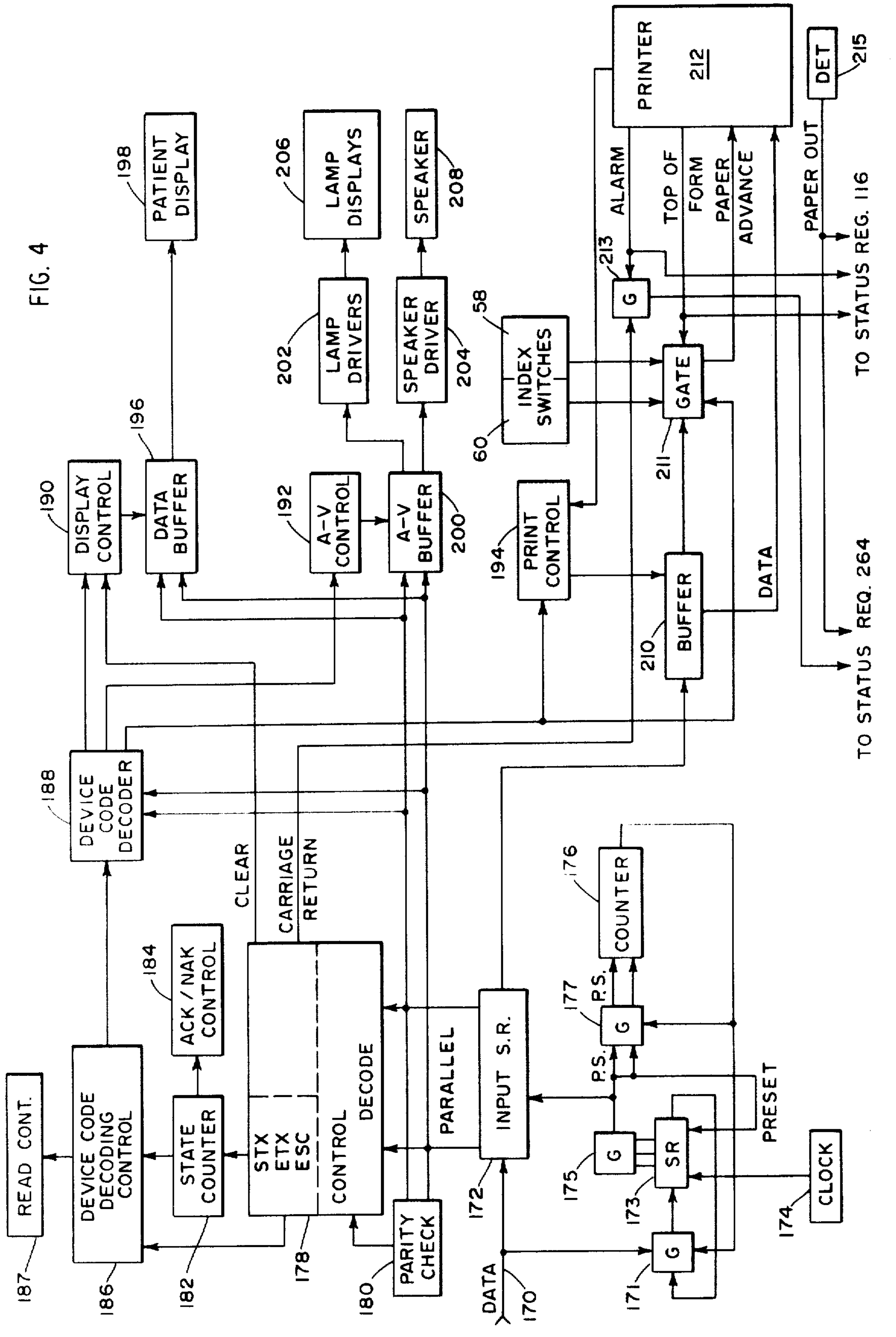
FIG. 4 is a detailed block and schematic diagram of the receiver portion of the input-output terminal of FIGS. 1 and 2.

With reference now to FIG. 3A, a state diagram is indicated governing the operation of the receiver portion of the block diagram in FIG. 2 and in particular the control function provided by the code detection and control system 86, or more particularly the state counter 182 of FIG. 4. From an idle state 134 detection of a start-text code puts the control system 86 into a state 136 waiting for detection of additional message coding. A further start-text code (STX) will maintain the system in state 136 as will an escape code (ESC). A legitimate device code will cause the system to jump from state 136 to state 138 which enables the particular device for which information is addressed through the decoder 96. A subsequently received end-text code returns the system to state 134 while an escape code returns it to state 136. The transition from state 138 to 134 in response to the end-text signal causes the generation of an acknowledged signal.

Detection of error or illegal codes anywhere in states 136 or 138 causes the system to jump to state 140 in which a notacknowledged message is generated and sent to the hospital information system. State 140 is excited only in response to detection of a start-text code which puts the system into state 136.

Figure 5:
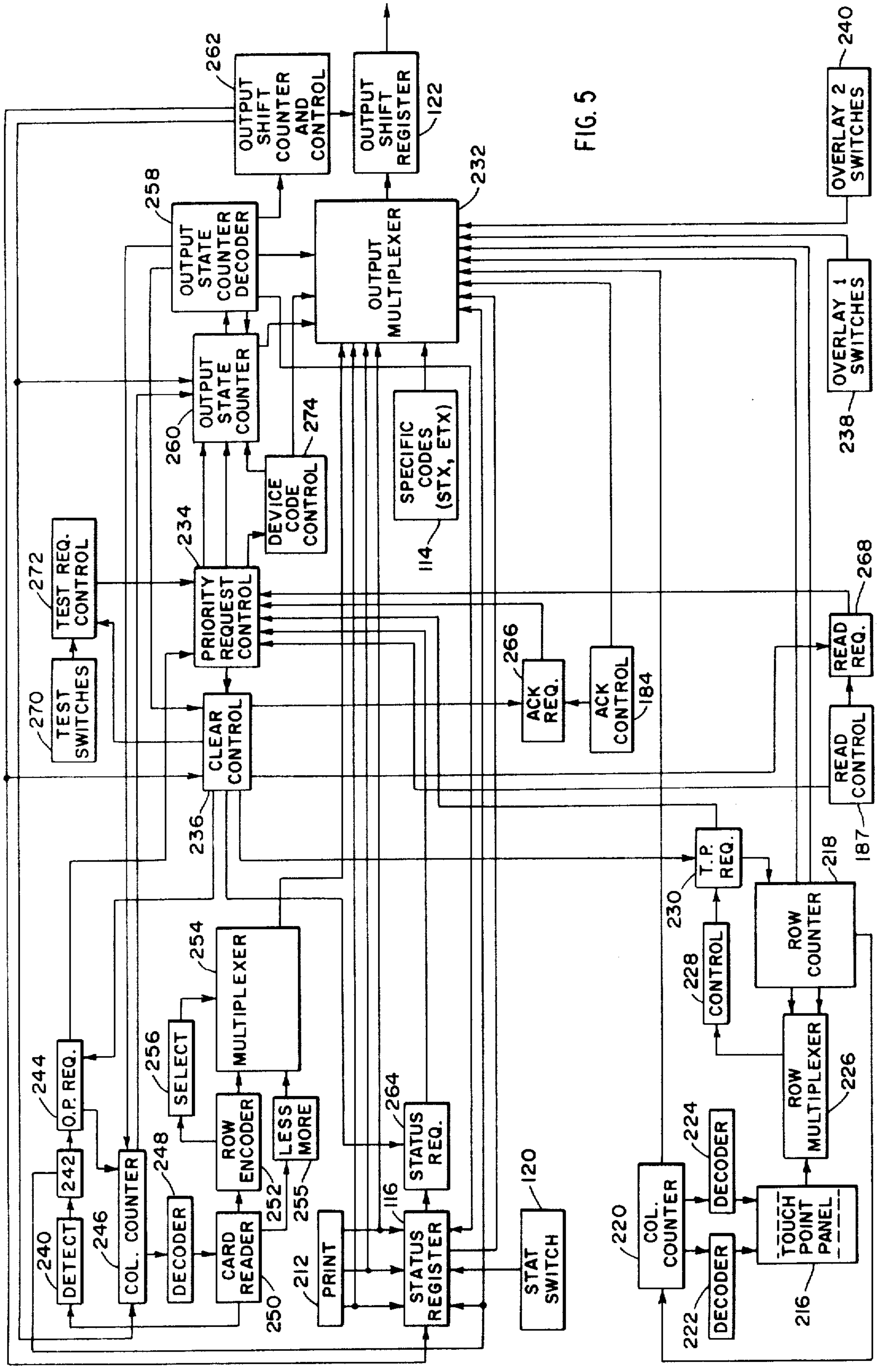
FIG. 5 is a detailed block and schematic diagram of the transmitter portion of the input-output terminal of FIGS. 1 and 2.

Referring now to FIG. 3B, the operation of the transmitting portion of the terminal is presented as a state diagram governing the functioning of the send controller 106 of FIG. 2, or the state counter 260 of FIG. 5. From a null condition 142 the system detects an output and priority request signal from send controller 106 which initiates a state 144 in which a start-text is generated by the composition system 110. If the message is to be an acknowledgment signal a state 146 is entered in which there is generated an acknowledged (ACK) or not acknowledged (NAK) code as one of the predetermined bit combinations in the specific codes system 114. Subsequently state 148 is entered in which the endtext coding is generated by the composition system 110 through the specific code system 114. From state 148 the system is returned to either state 144 or 142 depending respectively on whether an output request is received from the send controller 106.

Assuming that an acknowledge message was not to be generated, then from state 144 a state 150 is entered in which the particular device code for the message source is composed. If the originating device is the card reader a state 152 is entered in which the card indicia is transmitted by the composition system 110 through the shift register 122 until an indicia from the card reader 108 indicates that data has been completely readout. In that case operation jumps to state 148. If the source device is the touch point system 112, a state 154 is entered in which overlay coding is provided from the touch point system 112 through the composition system 110. Subsequent state 156 provides further overlay coding and is followed by states 158, 160 and 162 in which respectively a row and two column words are generated indicating the particular switch activated in the matrix of the touch point system. Subsequent to state 162 the transmit system transfers to state 148. If a status message is to be generated a state 164 is entered from state 150 and the data in the status register 116 is caused to be transmitted through the shift register 122 by the output message composition system 110. Subsequently state 148 is entered and the system returned to states 142 and 144 as indicated above. If a test message is to be generated, the transfer from state 150 is to state 148 after the device code is transmitted in state 150.

If in state 150 neither of the above indicated sources were activated to send a message, the send controller transfers from state 150 to 148 to end transmission.

In FIG. 3C a portion of the state diagram of FIG. 3B is indicated to represent the required transmission capabilities for a terminal having receive only functions as might be the case with a dietary or maintenance terminal. In that case, subsequent to state 150 only states 164 and 148 are provided for status or notstatus messages.

A complete understanding of the design and operation of the input-output terminal will follow from a description in detail of the receiver and transmitter portions respectively shown in FIGS. 4 and 5. With specific reference to FIG. 4, and the receiver portion, input data addressed for the terminal is received from the data processing system 80 on a line 170. The data on line 170 is applied to an input shift register 172 and a gate 171 for application to a shift register 173. An AND gate 175 detects predetermined states in shift register 175 to provide preset to register 175, a shift output to shift register 172 and through a gate 177 to a character bit counter 176. Shift register 173 is stepped by a clock 179 at a rate greater than input data bit rate so that when a legitimate character as distinct from noise is received several stages of register 173 will detect this condition to mark the center of the data bits and establish synchronization. Gate 175 advances register 172, and presets counter 176 through gate 177 assuming counter 176 is in the ten count state to enable gate 177 for presetting. Thereafter, gate 177 is enabled to pass gate 175 signals to an advance input of counter 176, and gate 171 is switched to pass the output of register 173 to its input and to trigger a counter mode of operation in register 173 such that AND gate 175 will continue to mark each bit position center.

A parallel output of shift register 172 is applied to a control character decoder 178 and also provided through a parity test circuit 180 to the decoder 178. The decoder 178 detects start-text, end-text and escape codes and controls a receiver state counter 182 according to the state diagram of FIG. 3A. State counters as known in the art provide a controlled count to regulate system operation according to a predetermined sequence as determined, in the present case, by the FIG. 3A diagram. Control words such as display clear and printer carraige return are applied to display and print controls. The state counter 182 supplies a signal to an acknowledgment control circuit 184 during state 140 and the transition from state 138 to 134 to cooperate with the transmitter circuitry of FIG. 5 to be described below. Parity error sets counter 182 to trigger control 184 to send a not-acknowledged signal. The states of counter 182 are supplied to enable a device code decoding circuit 186 to respond to the read or write indicating device codes in incoming data during state 136 in the FIG. 3A state diagram. If a read code is detected, a read control buffer 187 is enabled which functions with the transmitter system in FIG. 5. If the device code indicates a write command, a device decoder circuit 188 is enabled to respond to the parallel output from the shift register 172 and, through gating, to detect the address for the incoming data and to provide an enable signal to the appropriate output unit being addressed. Accordingly the decoder 188 is connected to supply a signal to a display control circuit 190, a control message control circuit 192, and print control circuit 194 depending upon the detected device code in the shift register 172. The display controller 190 and print controller 194 also receive outputs from the control character decoder 178 to enable them to respond to the incoming data.

The display controller 190 is activated to an enable state by decoder 188 to cause a display data buffer 196 to respond to the message output of the shift register 172 to register that data representative of patient name where it is applied to a patient display 198 for decoding and visual presentation. For example, a Burroughs Corporation SELF-SCAN Panel Display Model SSDO132-0040 may be used for units 190, 196 and 198.

The controller 192 similarly responds to an enable signal from decoder 188 to cause a buffer 200 to receive the parallel message data in the shift register 172 and provide that data to a lamp driver system 202 and a speaker driver system 204 which in turn enable a plurality of lamp displays 206 or speaker 208 to provide an audible tone normally present when the STAT request is received as the message portion of incoming data. The lamp displays 206 are operative to enable one or more of the lamps 54, 64 or 70 depending upon the data contained in the shift register and the decoding vocabulary. Typically each message bit will correspond to a specific lamp or speaker and activation of the corresponding bit in buffer 200 causes the proper light or speaker activation.

The print control system 194 is similarly activated by decoder 188 for a printer device code to cause a printer buffer 210 to respond to the data in the input shift register 172 in serial to provide temporary storage of data en route to a printer 212. The functions of the printer 212, control 194 and buffer 210 may typically be provided by the General Electric Co. Termi Net 300 Printer. Additionally, a gate 211 responds to the line and page index signals from switches 60 and 58 and a top of the form signal from printer 212 to advance one line when line advance switch 60 is activated, or advance continuously until top-of-form is indicated from printer 212 in response to activation of the form advance switch 58. Gate 211 is inhibited when device decoder 188 supplies an enable signal to control 194 for printer activation. Line and form advance data are supplied from buffer 210 to gate 211 for similar printer control. A gate 213 receives an alarm signal from printer 312 when not ready to print and applies this signal to a status request register in FIG. 5. The gate 213 is enabled with each carriage return control signal from decoder 178. The alarm signal is also applied to the status register 116 in FIG. 5. A paper out signal from a detector 215 in the printer paper bin supplies a paper out signal to the status request register and the status register 116 completing the printer operation.

Turning now to FIG. 5 the transmitter portion of the input-output terminal control electronics is indicated. In the lower left, the touch point code generating system comprises a matrix 216 having the three sets of switches shown in FIG. 1 associated with the overlay 28, the alpha and patient identification keyboard 42, and the control switches 48, 50 and 52. A row counter 218 is cycled through its states and provides a carry output to a column counter 220. The column counter 220 operates through decoders 222 and 224 which depending upon the count of the column counter 220, selectively enable one of the column inputs to the matrix 216. The row connections of the matrix 216 are supplied to a row multiplexer 226. When a signal is conducted through the matrix 216 from decoder 222 or 224 to multiplexer 226 on an input which is enabled by the row counter 218 the signal is applied through a control circuit 228 to set a touch point request gate 230 to suspend counting by the row counter 218 and correspondingly the column counter 220. The counters are thus set at a digital state representative of the switch which was activated. The states of these counters are applied to an output multiplexer 232 from which they may be selected for application to the output shift register 122 as will be explained subsequently. The touch point request gate 230 is normally enabled to permit continuous running of the counters 218 and 220. When a switch in the matrix 126 is closed, the touch point request gate 230 inhibits the counter 218 and at the same time provides a request signal to set a priority request control selector 234 within the send control electronics 106 of FIG. 2. The selector 234 includes a priority gating system so that the highest priority request is acted on first and that requesting device is identified in the selector 234 output. A typical priority level is, in order of priority status, acknowledgment, touch point, card reader, test and read. When the control selector 234 has operated on this request it provides a signal to a clear control gate 236 which in turn reenables the request gate 230 to commence running of the counter 218.

First and second overlay switch detectors 238 and 240 sense overlay identifying indicia in the portion 32 of the overlay 28 as indicated in FIG. 1 and provide digital output signal representations indicating the particular overlay in place and apply these representations to the output multiplexer 232 for selection at appropriate times in the transmission of a message from the touch point source under state control by an output state counter 260 operating in states 150, 154, 156, 158, 160, 162, and 148 according to FIG. 3B. State counter 260 enters state 154 from state 150 in response to the touch point request signal applied to control 234.

Turning now to the operator identification card reader system in the upper left of the drawing in FIG. 5, a detect system 240 senses from a card reader 250 a punch in the zero card column indicative of insertion of the card and applies a signal through a card detector 242 to set an operator card read request buffer 244 which in turn signals the priority request controller 234 of the request by the card reader system to transmit card identity. The operator card read request buffer 244 also presets a column counter 246 which begins counting through a predetermined number of states each of which are applied to a decoder 248, to step card reader 250 from one column to another along the card until all columns have been read. A row enable gate 252 responds to each column from card reader 250 to identify and encode indicia in each row as column after column is read. The encoded row outputs are passed through a multiplexer 254 by an input selector 256. A detector 257 indicates if more or less than one hole has been detected in each column and provides an error signal to multiplexer 254 if other than one hole alone is detected.

The column counter 246 is enabled in its count from the output of an output state counter decoder 258 which responds to the output state counter 260. State counter 260 operates according to the FIG. 3B or 3C diagrams by known techniques to cycle the transmitter section through the indicate message generation, test and transmission steps. The column counter 246 enable signal is received in state 152 entered by the appropriate device signal from the controller 234. When the counter 246 has reached the count corresponding to the last card column a signal is provided to the output state counter 260 causing indexing of the state counter to subsequent state 148. Column counter 246 steps in response to an overflow output from an output shift register counter 262 which provides the clocking output for the output shift register 122. The operator card read request buffer 244 which indicates to the priority request control 234 the desire for transmission of an operator identification signal is reset by the clear control system 236 in response to the priority request controller 234 having accepted the card signal. The card reader 250 may typically be the AMP Corporation SYSCOM Card Reader Model 161.

The status register 116 at separate bit storage locations receives three inputs from the printer 212 indicating a paper out condition, positioning of the printer for marking at the top of a page on a roll of separable sheets, and printer alarm system indicative of an error in the printer operation. The register 116 also receives a card out indication from the card detector 242 and a STAT response indication from status push button switch 120. These individual inputs to the status register are also applied to the output multiplexer 232 controlled by counter 260 for compiling the appropriate bits in a status message. Activation of any of these inputs to the status register 116 sets a status request circuit 264 which in turn signals the priority request controller 234 to set state counter in state 164 from state 150. When the request is accepted the clear control gate 236 resets the status request circuit 264.

The generation of an acknowledge message is accomplished through an acknowledge control circuit 184 which is enabled by the receiver state counter 182 from FIG. 4. Control circuit 184 signals an acknowledge request register 266 to provide an acknowledge message signal to priority request controller 234 and is in turn cleared by the clear control gate 236 when the priority has been accepted. The acknowledge controller 184 provides a predetermined digital code to the multiplexer 232 on inputs which are selected at the appropriate moment after the start-text portion of an acknowledge message to indicate either an acknowledged or not acknowledged condition. The acknowledgment request from buffer 268 to controller 234 presets state counter 260 to be governed by the data format 126 of FIG. 2B.

Similarly the read control buffer 187 responds to a signal from the device decoder 186 in FIG. 4 whenever a received message indicates that the data processing system 80 is requesting a read function. The controller 187 sets a read request register 268 which requests transmission from the priority request controller 234 available when no higher priority sources are requesting transmission. The read control buffer 187, containing the read indicating device code as supplied from device code controller 186 and decoder 178. This read indicating device code is supplied to device code registers 274 for transmission through the multiiplexer 232 at the appropriate data time as specified by output state counter 260. The message portion of the read message will contain whatever data is present in the device being read at that time.

Similarly a test message request is generated by activation of one of several switches 270 which allows selection of a particular device code for the test transmission. This selection is communicated to a test request control register 272 which in turn activates the priority request controller 234 and control buffer 274 to preset state counter 260 to be governed by the format 130 of FIG. 2B for the generation of a test message. Clear controller 236 provides a reset of the test request controller 272 when the request is accepted.

Consider now the transmission from the FIG. 5 electronics of a message from any of the above described sources. This is accomplished under the control of the output state counter 260 and output state counter decoder 258 which operate to cause the output multiplexer 232 to select appropriate inputs for the message being generated. In particular the specific codes system 114 provides the start-text and end-text characters to the multiplexer for selection as the initial and terminal words for each transmitted message. Subsequently, except in the case of the generation of an acknowledge message, a device code is transmitted in correspondence with a signal from a device code control register 274 which is operated by the priority request controller 234 to indicate the device operating as a message source in accordance with the highest priority device that control 234 is processing. Register 274 may hold plural specific codes which are activated by controller 234 in accordance with the device transmitting. The counter 260 also controls the multiplexer 232 in the subsequent state through the decoder 258 to select the appropriate inputs depending upon whether the message is a status message, acknowledge message, test message, or data from the card reader or touch point panel. For this purpose counter 260 is set in the state for the appropriate device by a signal from the priority request controller 234. Where additional data sources are desired, the device code sets and state counter states are readily expandable to accommodate them.

Subsequently, at the next succeeding state, the counter 260 causes the multiplexer to return to the specific codes system 114 to generate the end-text signal.

According to the above disclosed input-output terminal for operation with the hospital information system a terminal having plural input and output capabilities is multiplexed according to a predetermined priority schedule into two-way communication with a hospital information system. The collection of these functions in a single low cost terminal provides ease of entry and receipt of data according to the specific function for which the terminal is provided. Flexibility is maintained in handling diverse types of input information and providing output in a plurality of formats that permit efficient information presentation and utilization. While the specific implementations presented above disclose and teach the use of an operating system, it will occur to those skilled in the art that modifications and alternatives can be employed without departing from the spirit of the invention. It is accordingly intended to limit the scope of the invention only as indicated in the following claims.

What is claimed is:

1. An input-output terminal for the multiple format presentation of received data and for the common transmission of data generated from multiple terminal sources, said input-output terminal including:
   means for receiving terminal bound data at said terminal;
   means for detecting indicia in said received data indicative of data destination from a set of destination codes;
   a plurality of data display means including:
      first means for displaying a data subject; and
      second means for displaying data message content;
   means responsive to detected indicia in said received data for selectively enabling said first and second display means;
   means for compiling data for transmission from a plurality of data sources;
   means for identifying to said compiling means the source of data for transmission according to a priority scheme which identifies a data source on the basis of source type;
   automatically operative terminal condition source composing means;
   first source means for composing message data to represent a data subject for which data is relevant;
   second source means for composing message data relevant to said subject from a repertory to represent message content; and
   means for applying data from said composing means to said compiling means for selective transmission under control by said identifying means according to said priority scheme.

2. The input-output terminal of claim 1 wherein said second means includes a printer selectively providing a printed separable tag format and a continuous sequence of information format.

3. The input-output terminal of claim 1 further including:
   third means for displaying data control indicia; and
   third source means for composing data control messages;
   said selectively enabling means being operative to selectively enable said third display means; and
   said data applying means being operative to apply data from said third source composing means to said compiling means for identification for transmission according to said priority scheme.

4. The input-output terminal of claim 3 wherein said first, second and third source composing means further include:
   respective first, second and third sections of a switch matrix;
   means for scanning said switch matrix to detect activation of a switch; and
   means for developing an output indication of a detected activated switch for application to said compiling means.

5. The input-output terminal of claim 4 further including:
   means for interchanging the message content repertory represented by each switch in the second section of said switch matrix with a plurality of repertories; and
   means for identifying the repertory in association with said second section for application to said compiling means.

6. The input-output terminal of claim 3 wherein:
   said third display means includes actuable means for displaying immediate action request control data;
   response means are provided responsive to operator actuation of said actuable means for composing message data for application to said compiling means to indicate operator response to the displayed immediate action request control data; and
   said identifying means includes means for identifying said response means to said compiling means for transmission of data therefrom with relative immediacy.

7. The input-output terminal of claim 1 further including:
   third source means for composing operator identifying message data;
   said applying means being operative to apply said operator identifying message data to said compiling means for transmission according to said priority scheme.

8. The input-output terminal of claim 1 further including:
   third source means responsive to received terminal bound data for composing acknowledgement message data to indicate receipt of said terminal bound data;
   said applying means being operative to apply said acknowledgement message data to said compiling means for selective transmission according to said priority scheme.

9. The input-output terminal of claim 1 further including:
   means responsive to received terminal bound data for detecting a predetermined data pattern representing a request to read data from an indicated composing means; and
   means responsive to the detected predetermined data pattern and indicated composing means for directing said identifying means to identify said identify said indicated composing means to said compiling means for transmission of data from said indicated composing means.

10. The input-output terminal of claim 1 further including:
   means for selecting one of said composing means for test transmission; and
   means for indicating the selected composing means to said identifying means to provide for the transmission of data from said selected composing means by said compiling means according to said predetermined scheme.

11. An input-output terminal for hospital data comprising:
output means for providing an output indication of control data;
output means for providing an erasable output indication of a patient for whom data is relevant;
output means for providing printed output data in a selectable format;
means for receiving terminal bound data having an address portion indicating one of said output means as a destination;
means responsive to the received terminal bound data address portion for directing said received data to the addressed output means;
message source means for composing a patient identification signal;
message source means for composing an operator identifying signal;
message source means for composing an instruction signal;
message source means for composing a control message signal;
message source means for composing a terminal status signal; and
means for compiling said signals from said composing means into a signal for transmission according to a predetermined message source selection scheme which provides selection based on a priority assigned to each message type.

12. The input-output terminal of claim 11 further including high priority message source means responsive to a predetermined pattern in received terminal bound data for composing a data reception acknowledgement signal for application to said compiling means.

13. The input-output terminal of claim 11 further including means responsive to a predetermined signal and the address portion of received terminal bound data indicative of a read instruction for a terminal located message source means for causing said compiling means to respond to signals from the addressed terminal located message source means for transmission thereof.

14. The input-output terminal of claim 11 further including test operator activated means for causing data in a selected composing means to be applied to said compiling means for transmission.

15. The input-output terminal of claim 11 further including immediate action indicating-response means comprising:
means responsive to received terminal bound data with addressing for said control data output means for detecting a predetermined signal therein indicative of an immediate action request;
immediate action alarm means responsive to detection of said predetermined signal for providing an indication thereof; and
means associated with said alarm means and responsive to operator activation thereof for composing a terminal status signal indicative of operator attention to the alarm indication for application to said compiling means for transmission.

16. The input-output terminal of claim 11 wherein said instruction, control and patient identifying signal composing means include:
a switch matrix arranged in first, second and third sections for respectively said instruction, control and patient identifying signals;
a plurality of interchangeable instruction repertories adapted for selective association with said first section and having a repertory identifying key;
means for detecting said repertory identifying key and for composing a repertory identifying signal for application to said compiling means;
means for scanning said switch matrix to detect switch activation; and
means for providing a digital representation of detected activated switches for application to said compiling means.

17. A data input-output terminal for a hospital information system comprising:
data display devices including:
a patient name display operative to indicate the indentification of a patient for whom data is relevant;
a printer operative to provide output information in different formats for use at hospital and medical office locations;
means for displaying at said terminal an indication of terminal condition in association with data flow between said terminal and said hospital information system;
means for receiving data from said hospital information system and for detecting indicia in said data indicating a data display device address;
means for providing said received data to the apropriate display device according to the detected address;
message generating devices including:
an operator actuable operator identification detection system;
automatically operative means for indicating terminal condition;
an operator actuable data input keyboard divided into a plurality of portions including a portion to provide selection of data phrases from a plurality of selectable repertories of predetermined data phrases adapted to provide selectable instructions concerning a given patient, a patient identification input portion adapted to permit operator identifying of a patient for whom instructions are being entered, and a control instruction portion operative to generate predetermined control signals;
means for identifying a message generating device for transmission according to a predetermined priority scheme;
means operative in response to operator actuation of said operator identification means, said means for indicating terminal condition and the plurality of portions of said keyboard to provide an output digital signal for transmission to said hospital information system according to said predetermined priority scheme and to provide in said data indicia of the originating message generating device.

18. The input-output terminal of claim 17 further including:
means associated with said generating and display devices for generating a condition indicating signal representative of predetermined generating and display device conditions and for applying said condition indicating signal to said output digital signal providing means.

19. The input-output terminal of claim 17 further including:

means responsive to received data for detecting whether said data follows a predetermined data format; and means responsive to detection of said predetermined format for generating an acknowledging signal for application to said output digital signal providing means for transmission with a relatively high priority.

20. The input-output terminal of claim 17 further including:

means operative to detect predetermined data patterns in received data indicating a read request from an identified message generating device; and means operative in response to detection of said message generating device read request in received data for activating said output digital signal providing means to produce an output digital signal representative of data from the identified message generating device.

* * * * *